Dec. 8, 1936. A. D. MERRILL Re. 20,200

TREATMENT OF DIGESTION LIQUORS

Original Filed July 15, 1932 2 Sheets-Sheet 1

INVENTOR
Albert D. Merrill
BY C. E. Hammett, Jr.
ATTORNEY

Dec. 8, 1936. A. D. MERRILL Re. 20,200

TREATMENT OF DIGESTION LIQUORS

Original Filed July 15, 1932 2 Sheets-Sheet 2

INVENTOR
Albert D. Merrill
BY C. C. Hammett Jr.
ATTORNEY

Reissued Dec. 8, 1936 Re. 20,200

UNITED STATES PATENT OFFICE 20,200

TREATMENT OF DIGESTION LIQUORS

Albert D. Merrill, Watertown, N. Y., assignor to Chemipulp Process Inc., Watertown, N. Y., a corporation of New York Original No. 1,945,504, dated January 30, 1934, Serial No. 622,619, July 15, 1932. Application for reissue January 29, 1935, Serial No. 3,986

35 Claims. (Cl. 92—11)

This invention relates to the digestion of fibrous material, and more particularly to the treatment of digester liquor. The object of the invention is the provision of improvements in methods and apparatus for the digestion of fibrous material and in particular for the treatment of digester liquors.

My invention results in the production of an improved and uniform pulp, as a result of improvements in the liquor circulating apparatus. In my preferred operation, the circulation of the liquor is considerably slower than has heretofore been the practice in the sulphite process. My apparatus for circulating and heating sulphite digester liquor includes steam coils within the vertical digester, circulation of the liquor being effected by means of a pump located outside the digester. The cook is not subject to interruption in the case of trouble in the circulating apparatus, and little or no deposit on the heating coils results even though the circulation should be interrupted during the cook.

I provide for the rapid withdrawal of side relief liquor at the initiation of the cook, thus preventing the entrance of contaminated liquor into the accumulator or acid storage tank. At the end of the cook I prefer to stop the circulation and to admit steam directly into the digester, and I have provided an improved method and apparatus for degassing the digester liquors at the end of the cook. Circulation of the liquor is accomplished through the blow off elbow of the digester, and this construction results in decided advantages due to elimination of the cost and difficulty of maintaining entrances through the lower part of the digester wall.

For a better understanding of my invention, a preferred embodiment thereof is illustrated in the accompanying drawings, in which.

Figure 1:
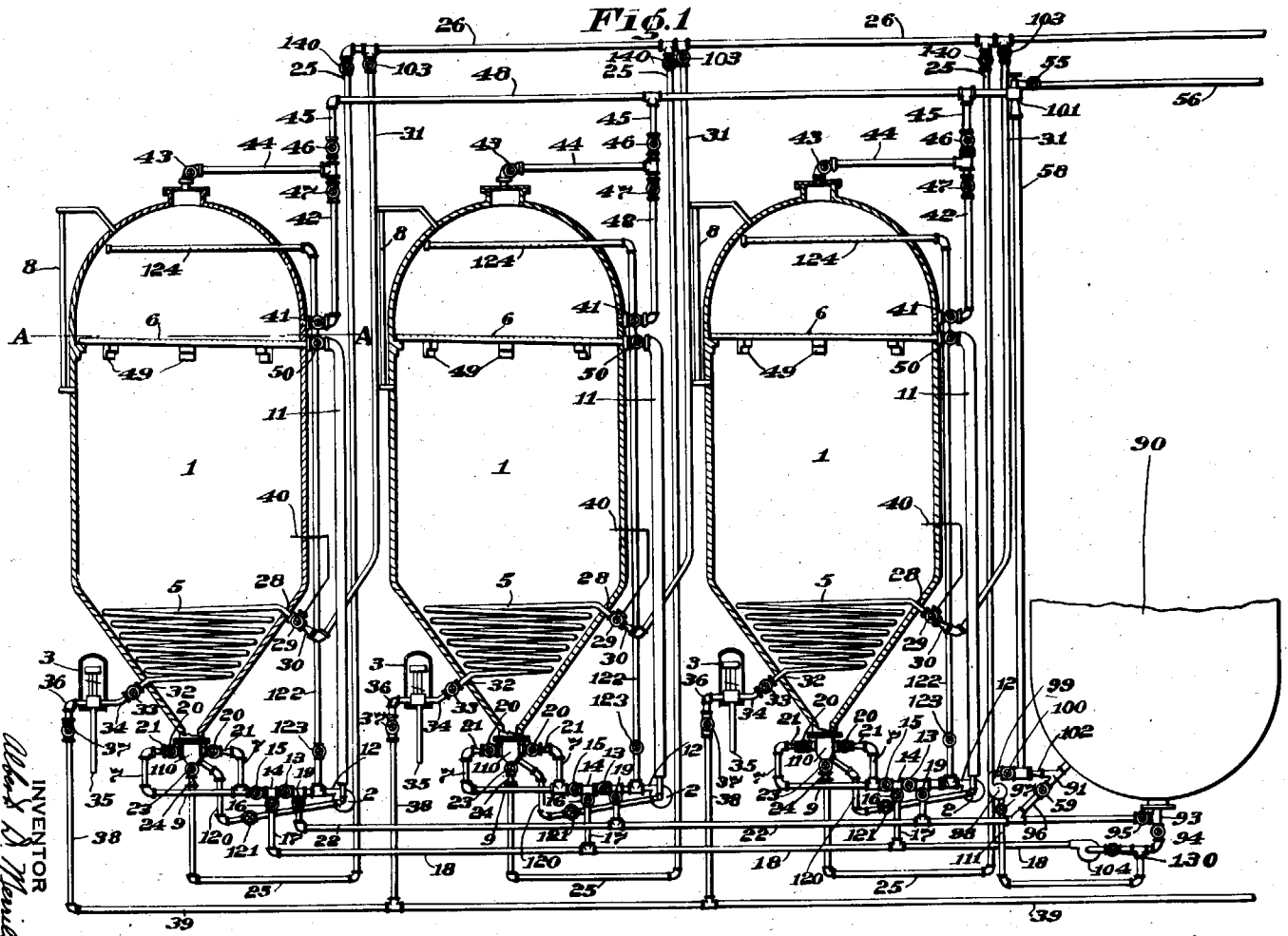
Fig. 1 is a diagrammatic elevation of a preferred digester system, certain parts being omitted for the sake of clearness.

In the drawings, the numeral 1 indicates sulphite digesters provided with gauge glasses 8. While three digesters are shown, any number, connected as indicated, may be used. 90 is either an acid accumulator or cold acid storage tank. The relief line 44 provided with the valve 43, and the relief line 42 provided with valves 41 and 47, communicate through the valve 46 with the line 45 and thence with the usual relief header 48. The header 48 leads to the eductor 101, which also connects through the valve 55 with the raw liquor supply line 56. The eductor 101 connects with the drop leg 58 which leads through the similar eductor 102 and the fitting 91 into the bottom of the acid accumulator. The operation of these relief connections may be in accordance with the disclosure of the co-pending application of T. L. Dunbar and A. D. Merrill, Ser. No. 576,254, filed Nov. 20, 1931, (now Patent No. 1,918,459, issued July 18, 1933) and forms no part of the present invention.

The acid filling header 18 leads from the accumulator through the T 93, valves 94 and 130 and pump 104, to the connections 17, 14 and 9, through valves 15 and 16. The accumulator liquor may thus pass to the branches 7 having therein valves 20 and check valves 21 and entering the blow off elbow 110.

The steam header 26 communicates through the line 25, valves 140 and 23 and check valve 24 with the bottom of the blow off elbow. The header 26 also connects through the line 31 and fitting 28, valves 29 and 103 and check valve 30, with the heating coil 5 inside the digester.

The valve 29 is provided with the thermostatic control 40 which is of a known type and operates automatically to shut off the steam when the temperature in the digester has reached a predetermined point. If desired the valve 29 can also be connected with a cam and timing mechanism so that the temperature in the digester is controlled thereby.

Condensate from the coils 5 passes through the lines 32 and 34 and valve 33 to the condensate selector 3, from which uncontaminated condensate passes through the line 36, valve 37, line 38 and header 39 to the hot well. If the condensate should become contaminated with acid liquor, the selector 3 automatically passes the contaminated condensate through the line 35 to the sewer.

Figure 2:
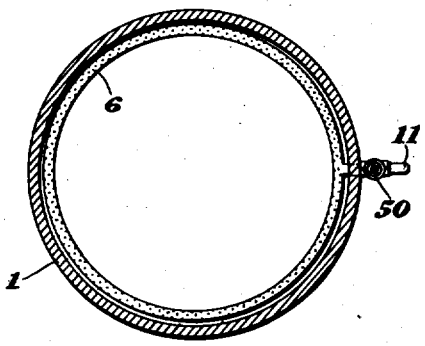
Fig. 2 is a horizontal section through the digester on the line A—A of Fig. 1 showing one form of strainer on the suction end of the circulation line.
Figure 3:
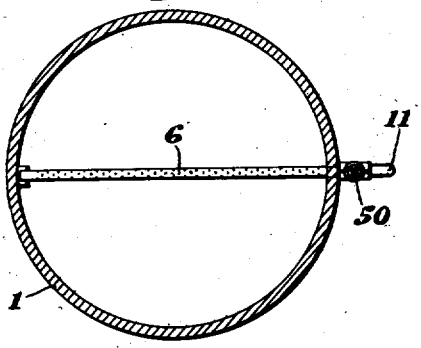
Fig. 3 is a similar view showing another form of strainer.

The circulating line 11, preferably surrounded by insulation to prevent loss of heat by radiation, leads from the upper part of the digester to the suction side of the pump 2. The suction end of the circulating line 11 enters the upper part of the digester through the valve 50, and is provided inside the digester with the strainer 6. In Figs. 2 and 3 I have shown two forms of the suction end strainer 6, either of which gives excellent results. The strainer may extend diametrically across the digester, as shown in Fig. 3, or it may be circular in form, as shown in Fig. 2, resting on the supports 49. The strainer is positioned in the digester so as to slope slightly toward the valve 50.

Figure 5:
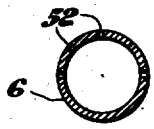
Figs. 4 and 5 are elevation and vertical sectional views respectively, illustrating the prefered construction of the strainer pipe.
Figure 4:
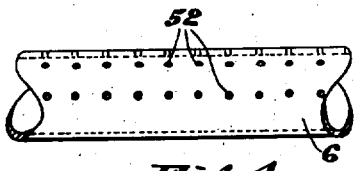

A preferred construction of the suction end strainer pipe is shown in more detail in Figs. 4 and 5, liquid inlet holes 52 being bored only in the upper half of the strainer pipe. It has in the past been customary to bore inlet holes around the entire circumference of circulation strainers, and the result of this construction is that practically all of the liquor is taken out of the digester in the neighborhood of the digester wall or where the suction is applied. In my construction of the suction end strainer the liquor is drawn in through the perforated upper half of the strainer 6 and runs along the imperforate lower half thereof to the circulating line. The pressure existing in the digester and the suction effect of the circulating pump assist in drawing the liquor through the perforations.

Figure 6:
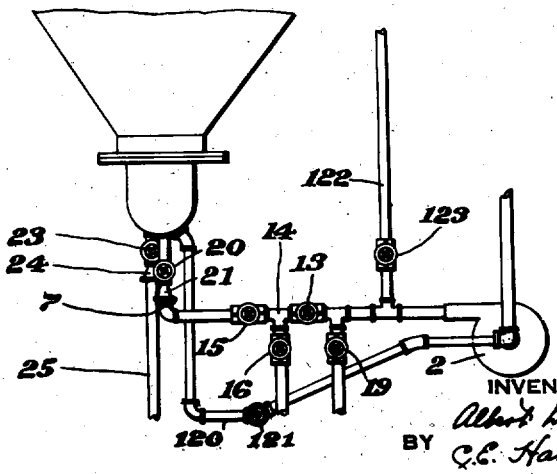
Fig. 6 is a diagrammatic elevation of the blow off elbow and connecting apparatus, illustrating an alternative connection to the circulating lines.

The pump 2 discharges through the line 12 and valve 13 to the connection 14 and thence through the valve 15 and line 9 into the lines 7, which lines, as stated above, enter the blow off elbow. While I have shown a plurality of entrances through the blow off elbow, excellent results may be obtained with only one entrance into the bottom of the elbow, as shown in Fig. 6.

The line 12 also connects through the valve 19 with the relief header 22. The header 22 leads to the accumulator 90, either through the valve 95 and the T 93 or through the line 96, valve 59 and fitting 91.

The line 120, provided with the valve 121, leads from the blow off elbow to the suction side of the pump 2. The line 122, provided with the valve 123, leads from the discharge line 12 of the pump 2 into the digester near the top thereof. On the end of the line 122, and within the digester, I provide the spray connection 124. The line 120 is provided with a strainer (not shown) at its termination inside the blow off elbow 110. At the end of the cook it is thus possible, by proper manipulation of the valves as hereinafter described, to utilize the pump 2 to withdraw digester liquor from the bottom of the digester and spray the same into the top thereof, resulting in liberation of $SO_2$ gas which passes out through the top relief connection.

The pump 98 connects through the valve 97 and line 111 with the filling header 18 at a point behind the valve 130 on the suction side of the pump 104. This pump 98 exhausts through the check valve 99 and valve 100 into the eductor 102 and thence through the fitting 91 into the accumulator. By these connections acid liquor from the accumulator may be circulated through the eductor 102.

Operation in accordance with my invention may be as follows:

The digester is filled with chips from a conveyor or from a chip bin in the usual manner, by removing the manhole cover at the top of the digester. The cover is then replaced and the digester sealed in. A vent at the top of the digester (not shown) is opened and the digester is filled with acid from the accumulator or acid storage tank 90 by means of the pump 104 and header 18. During the filling operation the valves 41 and 43 are closed. The valve 13 is also closed and valves 15, 16, 20, 94 and 130 are open. Liquor is thus pumped from the accumulator into the blow off elbow, through which it enters the digester. The valves 21 are check valves which close in the event that the pump 104 should shut down due to lack of power or other cause.

The pump 104 is kept running until a hydrostatic pressure of approximately 50 lbs. is pumped on the digester. The valve 16 is then closed, and the valve 13 in the discharge line 12 from the pump 2 and the valve 50 in the circulating line 11 are opened. The pump 2 is started and the digester liquor is circulated through the strainer 6, valve 50, line 11, pump 2, line 12, connection 14 and valves 13 and 15 to the lines 9 and 7 and thence through the valves 20 and check valves 21 into the blow off elbow 110, whence it passes up through the neck into the digester again.

As soon as the digester has been filled with acid the valve 103 is opened, admitting steam from the steam header 26 to the coil 5. From the coil 5 steam condensate is led to the selector 3. From the selector, uncontaminated condensate passes to the hot well while any contaminated condensate is automatically passed to the sewer. The condensate from the hot well may, of course, be utilized in a variety of ways.

It has heretofore been the practice to vent liquor through the side relief 42 at the beginning of the cook, by opening the valve 41 at temperatures between 110 and 125° C. When operating in this manner, however, it is sometimes impossible to draw off all of the side relief liquor with the necessary rapidity. Consequently some liquor which has been contaminated by constituents dissolved out of the wood may be carried over to the accumulator, thereby deteriorating the acid cooking liquor therein.

I am able to avoid this contamination by drawing off the side relief liquor through the circulating line 11. This I accomplish by closing the valve 13 and opening the valve 19, thereby causing the pump 2 to discharge into the header 22 and thence into the accumulator, either directly through the valve 95 and the T 93 or through the line 96, valve 59 and fitting 91. This method of operation permits withdrawal of all the side relief liquor within a very few minutes. For example, the side relief from the digester is normally started at about 110° to 115° C., and in operation according to methods heretofore available the temperature in the digester often reaches 130° or higher before all of the side relief liquor can be withdrawn, resulting in the contamination of the accumulator liquor. With my improved method and apparatus, however, I am able to withdraw all the side relief liquor in such a short time that the temperature in the digester does not rise high enough to result in contamination of the relief liquor (e. g., below 120° C.).

The side relief is continued until the liquor in the digester is brought to a predetermined level, which is ascertained by the gauge glass 8. After the liquor has been brought to this level the level remains practically constant until toward the end of the cook when steam is admitted to the digester as hereinafter described. This results in more uniform relief from the top of the digester during the period when the digester liquor contains considerable $SO_2$ gas.

The admission of steam into the coil 5 is continued until near the end of the cook. After the side relief liquor has been conducted to the accumulator the valve 18 is closed and the valve 13 opened, and circulation of the digester liquor is maintained. During the cook the valve 43 is open to vent relief gases to the header 48.

It has been customary to continue circulation of the digester liquor throughout the entire period of the cook, but I have found that this is not only unnecessary but actually disadvantageous. Toward the end of the cook, therefore—generally from one to two hours before the cook is finished—I stop the circulation of digester liquor and admit steam directly into the digester through the valves 23 and 140 and branch 25 to finish up the cooking. This steam dilutes the digester liquor and the agitation resulting from its admission assists in the liberation of $SO_2$ gas from the liquor. Further, this admission of steam shakes up the fibrous contents of the digester so that the blowing operation is more readily conducted.

The digester liquor contains substantial amounts of $SO_2$ at the end of the cook, and substantial loss results from running this spent digester liquor to the sewer. I have provided improved means for degassing the digester liquor inside the digester. At the end of the cook the valves 13 and 56 are closed and the valves 121 and 123 are opened. The digester liquor is thus withdrawn from the bottom of the digester through the blow off elbow by the pump 2 and sprayed in near the top of the digester, whereby $SO_2$ is substantially liberted therefrom, passes off through the relief connection 44, and is recovered. The admission of steam through the line 25 may be continued during this spraying operation.

I prefer to circulate the digester liquor during the cook at a much slower rate than has heretofore been universally advocated. A complete circulation of the digester liquor in 15 to 20 minutes has been recommended where direct heaters are used outside of the digesters, in order to obtain a scouring action of the liquor within the heater and prevent deposition of calcium or magnesium salts. I have found that this rapid circulation is a disadvantage. With my method and apparatus it is unnecessary, and I am able to produce a superior pulp by a complete circulation of the digester liquor in from 25 to 40 minutes, this time varying in accordance with the fibrous material being treated and local mill conditions. This slower circulation means less horsepower required of the motor which drives the pump, and smaller circulating lines and pump, which reduces the cost of the installation. Further, the slower circulation causes less liberation of $SO_2$ gas during the cook. Best results are obtained when the $SO_2$ gas is kept in the liquor, as far as possible, throughout most of the cook. My method and apparatus greatly facilitate proper control of the cooking operation and result in a much more uniform pulp.

When using an indirect heater outside the digester for the digester liquor, if the circulating pump stops for any reason the exchange heater immediately clogs due to precipitation of calcium and magnesium salts. By placing steam coils within the digester I am able to continue the cook without interruption even if the pump is temporarily stopped. The coils 5 are readily accessible for cleaning if this should be necessary, but I have found that by proper manipulation of the circulation there is no deposit on these coils. Another type of indirect heater, placed inside the digester, could be used.

The preferred construction of the strainer on the suction end of the circulation line results in uniform withdrawal of digester liquor from the upper part of the digester. By circulating liquor through the blow off elbow I avoid the expensive maintenance of inlets through the bottom part of the digester wall.

The rapid withdrawal of side relief liquor at the beginning of the cook prevents contamination of the liquor in the accumulator or acid storage tank. Degassing within the digester at the end of the cook results in material saving of $SO_2$.

The acid entering the digester may, with my method and apparatus, vary in temperature from 30 to 110° C., whereas in the past the maximum temperature has been 50° C. I have obtained excellent results employing hot acid containing 6 to 8% total $SO_2$, combined $SO_2$ from .8% to 1.4%, the balance free $SO_2$. The temperature of the liquor should not reach 110° C. until after thorough penetration of the liquor into the chips, but by using combined hot acid and circulation I cut down the penetration period very materially. By starting the digester with acid at a temperature of 80 to 110° C., in connection with circulation, the cooking time for any given quantity of pulp is reduced.

The maximum temperature is also reduced several degrees by this combined hot acid indirect heating and circulating method, and I am able to produce a very high quality pulp with a maximum temperature of 125° C. in a total cooking time of less than ten hours.

I claim:

1. In apparatus of the character described, a digester having therein an indirect heat exchanger, conduits for supplying steam to said heat exchanger and directly to the interior of the digester, a conduit positioned without the digester and connecting therewith, means interposed in said conduit for circulating digester liquor through said conduit and through the digester, and a passage connecting said conduit and said circulating means with a storage receptacle whereby liquor may be withdrawn from said conduit and passed to said receptacle.

2. Apparatus as described in claim 1 including a conduit for liquor connecting the lower part of the digester through the circulating means with means for spraying liquor into the upper part of the digester.

3. In apparatus of the character described, a digester, a conduit connecting the upper part of the digester with the lower part thereof, means for passing liquor through said conduit, and a passageway for liquor so connecting said conduit with a storage receptacle that the means for passing liquor through the conduit may act to withdraw liquor from the digester through said conduit and to pass the same through said passageway to the storage receptacle.

4. Apparatus as described in claim 3 including means for passing liquor from the storage receptacle into the conduit connecting the upper part of the digester with the lower part thereof, whereby liquor may be withdrawn from said storage receptacle and passed through said conduit into the lower part of the digester.

5. In apparatus of the character described, a digester, a conduit connecting the upper part of the digester with the lower part thereof, means for circulating liquor through said conduit and through the digester, a receptacle for liquor and means for passing liquor therefrom into said conduit and thence into the digester.

6. In apparatus of the character described, a digester, a conduit connecting the lower part of the digester with the upper part thereof, a second conduit connecting with the lower part of said digester and entering the upper part thereof, above the point of entry of said first conduit, said second conduit terminating within the digester at its upper end in means for subdividing liquor passing therethrough, and means for withdrawing liquor from the lower part of the digester and passing the same through said second conduit and subdividing means into the upper part thereof.

7. In apparatus of the character described, a digester, a conduit connecting the lower part of the digester with the upper part thereof, a pipe connecting the lower part of said digester with the upper part thereof and terminating at its upper end and inside the digester in means located above the normal liquor level for spraying liquor from the said pipe into the upper part of the digester, and a pump connected to circulate liquor through said conduit and also to force liquor through said pipe.

8. In apparatus of the character described, a digester, a conduit connecting with the upper part of the digester and entering the blow off elbow thereof through a plurality of entrances into said elbow, and means for circulating liquor through said digester, said conduit and said blow off elbow.

9. In apparatus of the character described, a digester having therein an indirect heat exchanger, conduits for steam connecting with the interior of the digester and with the said heat exchanger, thermostatic means for controlling the entrance of steam into the heat exchanger, and means for circulating liquor through the digester.

10. In apparatus of the character described, a digester, a pump, and a conduit connecting the digester with the suction side of the pump, said conduit connecting inside the digester with a suction end comprising an upper strainer portion and a lower imperforate channel portion, and a conduit connecting the discharge side of the pump with the inside of the digester.

11. In apparatus of the character described, a digester, a conduit connecting with the interior of said digester and terminating within the digester in a strainer having a perforated upper portion and an imperforate lower channel and so positioned within the digester as to slope toward the inlet end of said conduit, and means for withdrawing liquor from the digester through said strainer, passing the same through said conduit and returning the same to the digester.

12. In the digestion of fibrous material, charging a digester with fibrous material and filling said digester with acid liquor, withdrawing liquor from the digester at temperatures below 120° C. and passing the liquor thus withdrawn to a storage receptacle, then raising the temperature of the digester liquor above 120° C. by heating the same inside the digester without direct contact with the heating medium, and withdrawing liquor from the upper part of the digester and returning said liquor to the lower part thereof.

13. In the digestion of fibrous material, digesting fibrous material with acid liquor under heat and pressure while indirectly heating said liquor within the digester and circulating said liquor by withdrawing the same from the digester and then returning it thereto at a rate which effects a complete circulation of the digester liquor in from 25 to 40 minutes.

14. In the digestion of fibrous material, digesting fibrous material with acid liquor under heat and pressure while circulating said liquor through the digester and heating the same without direct contact with the heating medium, then stopping said heating and circulation, and admitting steam directly to the contents of the digester to complete the digestion of the fibrous material.

15. In the digestion of fibrous material, digesting fibrous material in heated sulphite liquor, then liberating sulphurous gas from said liquor by withdrawing liquor from the lower part of the digester and returning the same in subdivided condition to the upper part thereof.

16. In the digestion of fibrous material, digesting fibrous material in heated liquor, then degassing the digester liquor within the digester by admitting steam into the digester and withdrawing liquor from the lower part of the digester and spraying said liquor back into the upper part thereof.

17. Apparatus as described in claim 5 including means for passing liquor from said conduit into said receptacle.

18. In the digestion of fibrous material, charging a digester with fibrous material and with acid liquor, withdrawing liquor from the digester and passing it to a storage receptacle through a conduit connecting the upper part of the digester with said receptacle, then raising the temperature of the digester liquor, withdrawing liquor from the upper part of the digester through the said conduit and returning said liquor directly to the lower part of the digester.

19. In the digestion of fibrous material, digesting fibrous material in heated sulphite liquor, then liberating sulphurous gas from said liquor by withdrawing liquor from the lower part of the digester and spraying the same into the upper part of the digester.

20. In the digestion of fibrous material, digesting fibrous material in heated sulphite liquor while withdrawing liquor from the upper part of the digester and returning the same to the lower part of the digester, then liberating sulphurous gas from said liquor by withdrawing liquor from the lower part of the digester and returning the same in subdivided condition to the upper part of the digester.

21. In the digestion of fibrous material, digesting fibrous material in acid liquor under heat and pressure while withdrawing liquor from the upper part of the digester and returning the same in a plurality of streams into the blow off elbow of the digester.

22. In the digestion of fibrous material, digesting fibrous material with acid liquor under heat and pressure and heating the liquor within the digester without direct contact with the heating means, then admitting steam directly to the contents of the digester to finish the digestion of the fibrous material.

23. A process of digesting fibrous material which comprises subjecting a mass of the material in a digester to the action of a digestion liquor while maintaining the liquor above reaction temperatures, circulating the liquor to and from the digester during the reaction; establishing a volume of hot liquor in a pressure accumulator, recirculating such liquor directly to and from the accumulator and utilizing such recycle stream to absorb gases discharged from the digester.

24. In the digestion of fibrous material, digesting the material with acid liquor, while circulating the liquor to and from the digester, adding heat to the liquor during digestion without effecting any substantial dilution of the liquor; confining a volume of hot acid liquor in a pressure accumulator, circulating such liquor to and from the accumulator while adding thereto hot reaction products from the digester.

25. In the digestion of fibrous material, digesting the material with acid liquor, while circulating the liquor to and from the digester, indirectly heating the liquor during such circulation; confining a volume of hot acid liquor in a pressure accumulator, circulating such liquor to and from the accumulator while adding thereto hot reaction products from the digester.

26. In the digestion of fibrous material, charging a digester with fibrous material, pumping preheated acid liquor to the digester while venting air therefrom, sealing the digester and pumping additional acid liquor into the digester until a high hydrostatic pressure is established therein; then circulating the liquor directly to and from the digester until the material is penetrated with the acid and then raising the mass to reaction temperatures.

27. In the digestion of fibrous material, charging a digester with fibrous material, pumping preheated acid liquor to the digester while venting air therefrom, sealing the digester against access of air and pumping additional hot acid liquor therein until a high hydrostatic pressure is obtained; then circulating the liquor directly to and from the digester until the material is penetrated with hot acid, raising the mass to reaction temperature and discharging hot fluids from the digester during the reaction; establishing a volume of hot liquor in a pressure accumulator, recirculating such liquor directly to and from the accumulator while utilizing such recycle stream to absorb the hot fluids discharged from the digester.

28. In the digestion of fibrous material, charging a digester with fibrous material and filling the digester with hot acid liquor under high hydrostatic pressure, circulating the hot liquor directly to and from the digester, maintaining the circulation under said high pressure until the material is penetrated by the acid, rapidly withdrawing liquor from the digester at temperatures below 120° C. and lowering the liquid level of such liquor, and then heating the liquor to raise the temperature of the liquor above 120° C.; passing such withdrawn liquor to a high pressure accumulator and utilizing hot acid from the accumulator for charging another digester.

29. In the digestion of fibrous material, charging a digester with fibrous material, admitting hot acid liquor to the digester while displacing air therefrom, sealing the digester and forcing in additional hot acid liquor to establish a high hydrostatic pressure on the acid liquor; circulating the hot liquor to and from the digester while maintaining the temperature below 110° C. to effect penetration of the material; then raising the mass to reaction temperature, withdrawing hot relief fluids during reaction and passing such fluids into a volume of digestion liquor maintained in a pressure accumulator, and utilizing the preheated liquor in such accumulator to contact and digest material in another digester.

30. In the digestion of fibrous materials, charging the material to a digester, forcing hot preconditioned acid liquor into the digester while displacing air therefrom, sealing the digester and continuing the forcing of liquor into the digester until a high hydrostatic pressure is established in the digester and recirculating the hot high pressure acid directly to and from the digester while maintaining the temperature of the liquor below 110° C. until the material is thoroughly penetrated with acid, then raising the liquor to reaction temperatures.

31. In a process of the character described, charging a digester with fibrous material, introducing treating liquor into the digester until the latter is completely filled with the fibrous material and liquor, then sealing the digester and pumping additional liquor into the digester until a predetermined superatmospheric pressure is pumped on the digester, afterwards unsealing the digester, and then circulating such liquor through the digester.

32. In a process of the character described, charging a digester with fibrous material, introducing treating liquor into the digester until the latter is completely filled with the fibrous material and liquor, then sealing the digester and pumping additional liquor into the digester until a predetermined superatmospheric pressure is pumped on the digester, afterwards unsealing the digester, and then circulating such liquor through the digester until the temperature throughout the fibrous material in the digester is substantially equalized and raised to a substantially predetermined degree.

33. In a process of the character described, charging a digester with fibrous material, heating acid liquor in a separate receptacle by direct contact with digester relief fluids, forcing liquor from the receptacle into the digester until the latter is substantially completely filled with the fibrous material and liquor; forcing additional hot liquor into the digester until a predetermined elevated hydrostatic pressure is established on the liquor; circulating the liquor while maintained substantially at such presure directly to and from the digester and adding heat to the liquor during such recirculation.

34. In a process of the character described, charging a digester with fibrous material, heating acid liquor in a separate receptacle by a direct contact with digester relief fluids, forcing liquor from the receptacle into the digester until the latter is substantially completely filled with the fibrous material and liquor, forcing additional hot liquor into the digester until a predetermined elevated hydrostatic pressure is established on the liquor, circulating the liquor, while maintained substantially at such pressure, directly to and from the digester, adding heat to the liquor during such recirculation but maintaining the temperature below substantially 110° C. until the material is penetrated with the liquor and thereafter raising the mass to higher reaction temperatures.

35. In a process of the character described, charging a digester with fibrous material, admitting hot acid liquor to the digester and in sufficient quantity to build up a hydrostatic pressure of the order of fifty pounds; recirculating the liquor directly to and from the digester and adding heat to the liquor during such recirculation, controlling the amount of heat added to maintain the temperature below 110° C. until the material is thoroughly penetrated with acid, and then raising the mass to higher reaction temperatures.

ALBERT D. MERRILL.